(12) United States Patent
Mehr et al.

(10) Patent No.: US 6,924,970 B2
(45) Date of Patent: Aug. 2, 2005

(54) CAPACITOR METHOD AND APPARATUS

(75) Inventors: Behrooz Mehr, Chandler, AZ (US); Juan Soto, Chandler, AZ (US); Kevin Lenio, Chandler, AZ (US); Nick Holmberg, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/335,144

(22) Filed: Dec. 30, 2002

(65) Prior Publication Data

US 2004/0125535 A1 Jul. 1, 2004

(51) Int. Cl.[7] .......................... H01G 2/20; H01G 4/248; H01G 4/228
(52) U.S. Cl. ................. 361/308.1; 361/310; 361/306.3; 361/311
(58) Field of Search ................................ 361/303–305, 361/301.2, 301.4, 306.1, 306.2, 306.3, 310–313, 308.1, 308.2, 308.3, 321.1, 321.2, 321.3, 321.4, 321.5, 307; 29/25.42; 156/89.12; 257/532

(56) References Cited

U.S. PATENT DOCUMENTS

| | | | | |
|---|---|---|---|---|
| 1,571,501 A | * | 2/1926 | Van Deventer | 361/307 |
| 6,008,980 A | * | 12/1999 | Stevenson et al. | 361/302 |
| 6,306,688 B1 | * | 10/2001 | Lunceford | 438/127 |
| 6,477,032 B2 | * | 11/2002 | Makl, Jr. | 361/306.3 |
| 6,545,854 B2 | * | 4/2003 | Trinh et al. | 361/302 |
| 6,594,136 B2 | * | 7/2003 | Kuroda et al. | 361/306.1 |

FOREIGN PATENT DOCUMENTS

WO WO 00/55875 * 9/2000 .......... H01G/4/248

* cited by examiner

*Primary Examiner*—Eric W. Thomas
(74) *Attorney, Agent, or Firm*—Schwabe, Williamson & Wyatt, P.C.

(57) ABSTRACT

A method and apparatus is provided that pertains to a low inductance capacitor. The capacitor has a first surface electrically interconnected to a plurality of conductive electrodes and one or more second surfaces electrically interconnected to a plurality of electrodes interposed between the electrodes electrically interconnected to the first conductive surface. A dielectric layer separates the layered plurality of electrodes. The one or more second conductive surfaces are positioned within the body of the layered electrodes, such that the distance between the terminations of the first conductive surface and the one or more second conductive surfaces is shortened to lower inductance.

19 Claims, 2 Drawing Sheets

CAPACITOR METHOD AND APPARATUS

FIELD OF THE INVENTION

The present invention relates generally to capacitors and the manufacture thereof, and more particularly, to low inductance capacitors suitable for use with microelectronic circuits.

BACKGROUND OF INVENTION

Microelectronic devices are continually becoming smaller, and the circuit density, operating speeds and switching rates are continually increasing. This trend has impacted the design and manufacture of a variety of components that support the operation of microelectronic devices, such as voltage regulation devices, inductors, capacitors, and the like. In regard to capacitors, the decreased size and increased speed trend has amplified issues with respect to the inductance of capacitors, which have not previously been a critical concern.

Capacitors can be used for a variety of reasons, including as a means to store energy for use by microelectronic devices during periods of non-steady state or transient current demands, or to manage noise problems that occur in microelectronic circuit applications. Inductance is a capacitor limitation that is becoming more critical as microelectronic devices get smaller and faster. The higher the inductance, the slower the capacitor, as a power source, responds to a transient current demand. Accordingly, it is one goal of the industry to reduce inductance in capacitors, so as to allow them to timely respond to the energy demands as required by a microelectronic device (e.g. within the first few cycles).

FIG. 1 is a side view of an example of a capacitor of the prior art design. Capacitors commonly consist of a first conductive plate 10 and a second conductive plate 12. The first conductive plate 10 is electrically interconnected to a plurality of conductive first electrodes 14. The second conductive plate 12 is electrically interconnected to a plurality of conductive second electrodes 16. Dielectric material 18 is dispersed between the plurality of first electrodes and the plurality of second electrodes. The dielectric material 18 can be any nonconductive material, including, but not limited to air, aluminum oxide, ceramics, mica, and the like.

The charge or polarity of the first conductive plate 10 and the first electrodes 14 is opposite to the charge of the second conductive plate 12 and the second electrodes 16, such that the electrical energy of the charged system then is stored in the polarized dielectric. First conductive plate 10 terminates at first terminal 20 and second conductive plate 12 terminates at second terminal 22. First and second terminals 20 and 22 can then be electrically interconnected to a conductive path, such as a power trace in a printed circuit board that electrically interconnects a power source with a microelectronic device (not shown).

Inductance is dependent on factors such as the separation distance between first and second electrodes 14 and 16, as well as the first and second conductive plates 10 and 14. Generally, inductance is directly proportional to the distance between the oppositely charged surfaces, i.e. first and second electrodes 14 and 16 and first and second conductive plates 10 and 14, show by terminal distance arrow 24. As such, industry has attempted to reduce both distances, in order to reduce inductance. As new dielectric materials 18 with higher dielectric constants are developed, the distance between the conductive plates may be reduced.

New configurations and methods for reducing the distance between the conductive surfaces 10 and 12 are needed to reduce inductance of capacitors, which will increase the capacitor response time to the energy demands of the smaller, yet higher speed microelectronic devices.

DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Figure 2:
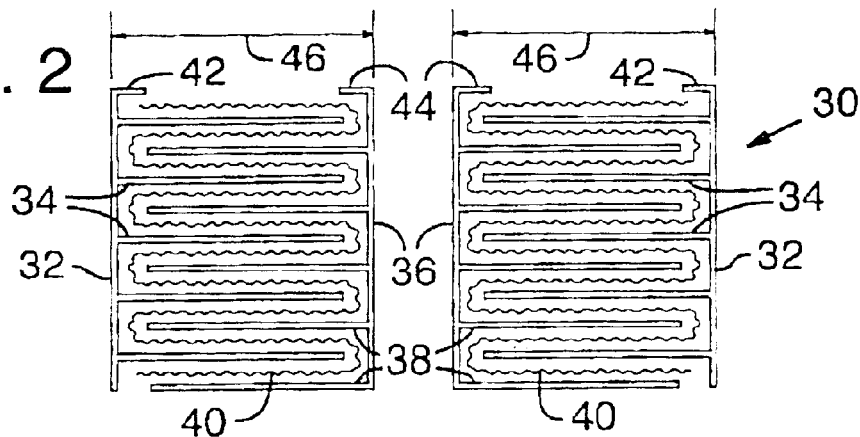
FIG. 2 is a cross-sectional view of a capacitor in accordance with an embodiment of the present invention.

FIG. 2 is a cross-sectional view of a capacitor 30 in accordance with an embodiment of the present invention. A plurality of conductive first electrodes 34 and a corresponding plurality of conductive second electrodes 38 are layered or interleaved to a predetermined number of layers. A dielectric material 40 separates each layered first electrode 34 and second electrode 38. The layered first and second electrodes 34 and 38, and the dielectric material 40, generally comprise the body of capacitor 30 defining a certain shape and size. A first conductive surface 32 is positioned about the perimeter of the capacitor 30. The first electrodes 34 are electrically interconnected to the first conductive surface 32 and extend generally perpendicular to the first conductive surface 32. The first conductive surface 32 and the first electrodes 34 have a predetermined charge or polarity.

The second conductive surface 36 is disposed in the body of the capacitor 30, generally penetrating the layers of the first and second electrodes 34 and 38. The second electrodes 38 are electrically interconnected to the second conductive surface 36 and extend substantially perpendicular to the second conductive surface 36, but are not electrically interconnected with the first conductive surface 32. The second conductive surface 36 and the second electrodes 38 electrically interconnected thereto have a charge that is opposite to the charge of the first conductive surface 32 and the first electrodes 34. The first conductive surface 32 terminates at the first terminal 42 and the second conductive surface 36 terminates at the second terminal 44. The terminals 42 and 44 can be configured to electrically interconnect to, for example, the power and ground plane of a power delivery path for a microelectronic device. The capacitor 30 can be encapsulated with a dielectric material to prevent grounding or electromagnetic influence from other devices (not shown).

Though first conductive surface 32 is shown in the illustrated embodiment to surround the perimeter of capacitor 30, the first conductive surface 32 may segmented and electrically interconnected to first electrodes 34 at different positions around the perimeter of capacitor 30.

Figure 1:
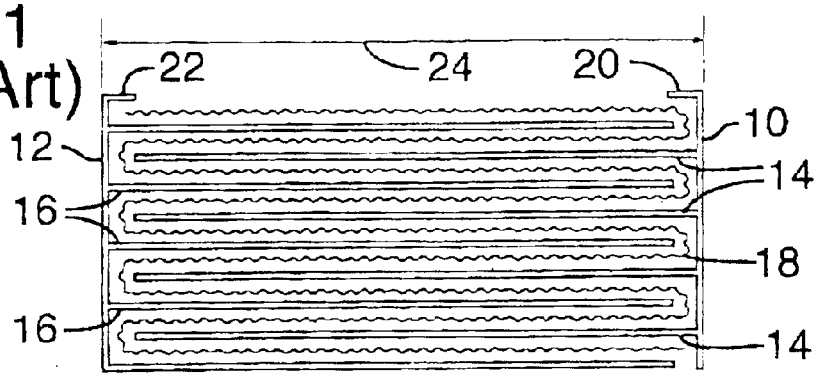
FIG. 1 is a cross-sectional view of an example of a current capacitor.

The inductance of the capacitor 30 is influenced by the separation distance between the first and second electrodes 34 and 38. The separation distance between first conductive surface 32 and second conductive surface 36, shown by termination distance arrow 46, directly impacts the inductance. Comparing termination distance 46 of FIG. 2 with the termination distance 24 of FIG. 1, the inductance of capacitor 30 will be lower as the terminal distance 46 is reduced, in this case to approximately one half in reference to FIG. 1. This reduction is due to the positioning the second conductive surface 36 into the body of capacitor 30, such that it is no longer on the opposite edge of the perimeter. The lower inductance allows the capacitor 30 to respond more quickly to the increased energy demand of a microelectronic device.

Figure 3:
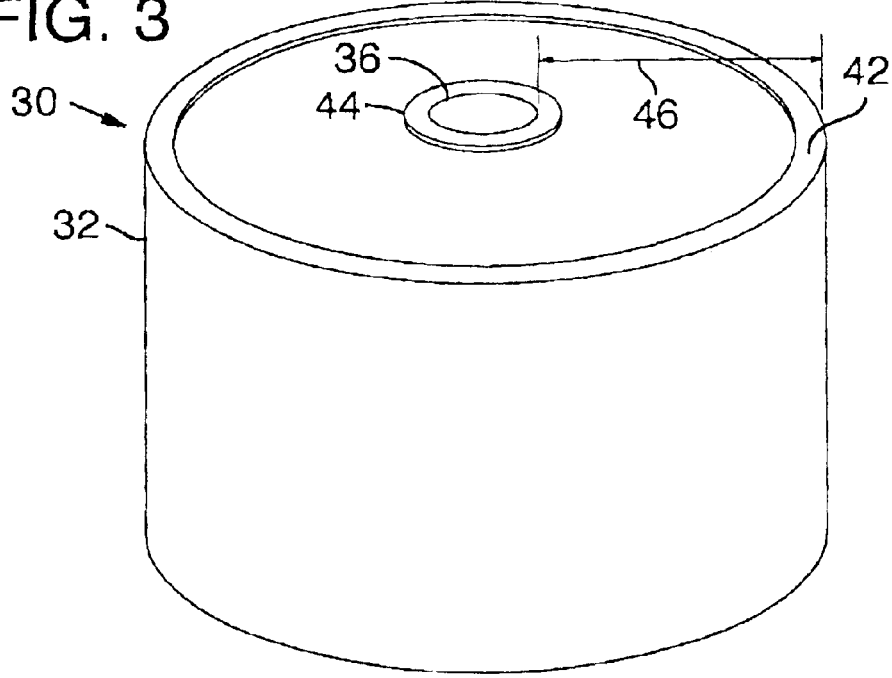
FIG. 3 is a perspective view of the embodiment of FIG. 2.

FIG. 3 is a perspective view of the capacitor 30 shown in the embodiment of FIG. 2. The first conductive surface 32 is electrically interconnected to the first electrodes 34 (not shown), and comprises at least a portion of the perimeter of the capacitor 30. The first conductive surface 32 terminates at first terminal 42 and has a charge. The second conductive surface 36 extends into the layers of the first and second electrodes 34 and 38 (not shown), and is electrically interconnected with the second electrodes 38 (not shown). The second conductive surface 36 terminates at the second terminal 44 and is opposite in polarity to the first terminal 42 and the first conductive surface 32. As shown, the termination distance 46, again, is roughly half what it would be if the capacitor 30 was of conventional design.

The capacitor 30 can be constructed in a variety of ways. In one embodiment in accordance with the present invention, individual sheets of the first electrodes 34 and the second electrodes 38 in the form of sheets can be layered with inserting a dielectric material 40 between each first electrode 34 and second electrode 38. Once the desired number of first and second electrode layers is reached, the capacitor 30 can be cut to any desired shape or size. The first conductive surface 32 can then be secured to the perimeter of the body of the capacitor 30 and electrically interconnected to the first electrodes 34. An opening within the body of the capacitor 30 can be created, for example but not limited to by drilling, and a second conductive surface 36 can be inserted in the opening and electrically interconnected with the second electrodes 38.

Alternatively, in another embodiment of the present invention, the first conductive surface 32 and the second conductive surface 36 can be pre-positioned. Pre-sized first electrodes 34 and second electrodes 38 can be alternately layered, with placing a dielectric material 40 between each electrode layer. As each first electrode 34 is placed it can be electrically interconnected with first conductive surface 32 and as each second electrode 38 is placed, it can be electrically interconnected with second conductive surface 36.

Figure 4:
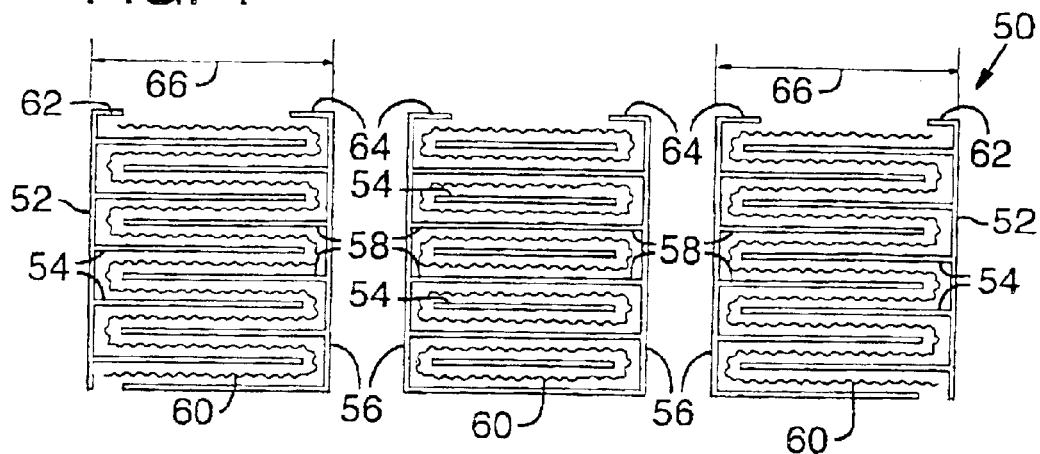
FIG. 4 is a cross-sectional view of a capacitor in accordance with another embodiment of the present invention.

FIG. 4 is a side view of a capacitor 50 in accordance with another embodiment of the present invention. A plurality of first electrodes 54 and a corresponding plurality of second electrodes 58 are interleaved or layered with a dielectric material 60 placed between each first and second electrode 54 and 58, such that the body of capacitor 50 is defined. The first electrodes 54 are electrically interconnected to first conductive surface 52 in a substantially perpendicular manner. A plurality of second conductive surfaces 56 are disposed within the body of capacitor 50 in the layered first and second electrodes 54 and 58. The second electrodes 58 electrically interconnect to the plurality of second conductive surfaces 56 and have an opposite charge as that of the first conductive surface 52 and first electrodes 54. First conductive surface 52 terminates at first terminal 62 and second conductive surfaces 56 terminate at second terminal 64.

Termination distance 66 is reduced by the plurality of second conductive surfaces 56 disposed within the capacitor 50, which in turn proportionally decreases the inductance. Like the embodiment described in FIG. 2, first conductive surface 52 need not entirely surround the perimeter of capacitor 50, but can be at a portion or multiple portions at spaced apart intervals.

Figure 5:
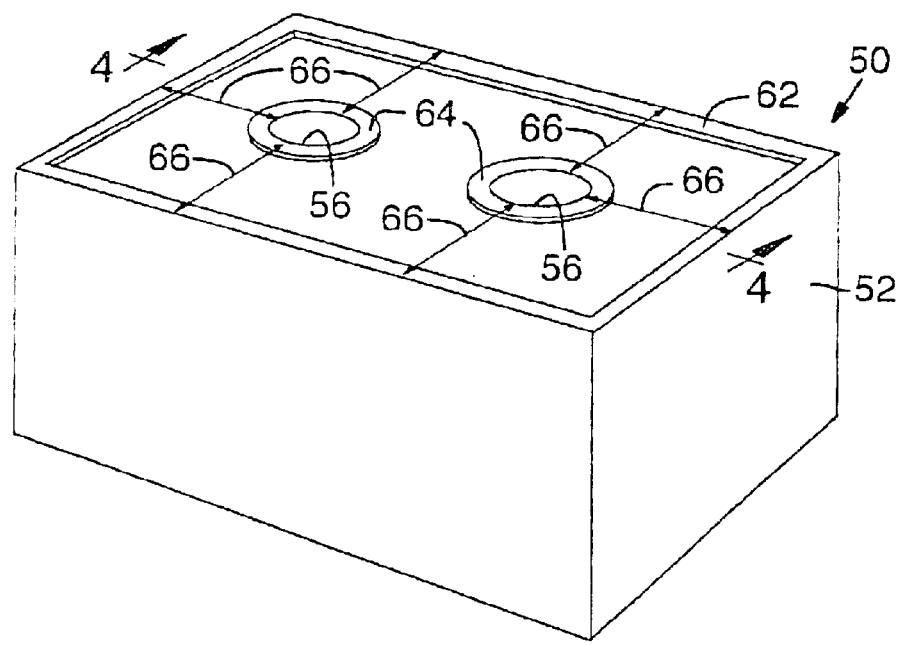
FIG. 5 is a perspective view of the embodiment of FIG. 4.

FIG. 5 is a perspective view of the capacitor shown in the embodiment of FIG. 4. The first conductive surface 52 is electrically interconnected to the first electrodes 54 (not shown), and comprises at least a portion of the perimeter of the capacitor 50. The first conductive surface 52 terminates at first terminal 62. The second conductive surfaces 56 are disposed through the layers of first and second electrodes 54 and 58 (shown in FIG. 4), and only electrically interconnect with the second electrodes 58 (shown in FIG. 4). The second conductive surfaces 56 terminate at the second terminals 64, and are oppositely charged to the first terminal 62 and first conductive surface 52. Termination distances 66, again, are roughly half what it would be if the second conductive surface 56 was on the perimeter at a position opposite to the first conductive surface 52.

The terminals 62 and 64 can be configured to electrically interconnect to, for example but not limited to, the power and ground plane of a power delivery path for a microelectronic device, or any other electronic device. Though not shown, the capacitor 50 can be encapsulated with a dielectric material to prevent grounding or influence from other devices. Methods of manufacturing the capacitor 50 or capacitors having a plurality of second conductive surfaces disposed within the body of the capacitor is the same as those methods described in regards to the embodiments of FIGS. 2 and 3, except multiple second conductive surfaces 56 are provided.

Though the second conductive surfaces 36 and 56 in the embodiments described herein in FIGS. 2 through 5 are cylindrical in shape with a hollow core, which helps with heat dissipation, it is within the scope of the invention for the second conductive surfaces 36 and 56 to be a polygonal, oblong or any other shape that allows for the second conductive surfaces to be disposed in the plurality of layered first electrodes 34 and 54 and second electrodes 38 and 58, such that the second electrodes 38 and 58 are electrically interconnected to the second conductive surfaces 36 and 56, and the second conductive electrodes 38 and 58 are electrically interconnected to the second conductive surfaces 36 and 56. The second conductive surfaces 36 and 56 can be solid, and their shape, as well as the shape and size of the capacitor itself can be varied depending on the desired configuration and taking into account manufacturing constraints.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A capacitor, comprising:
   a plurality of conductive first electrodes layered and spaced apart by a predetermined distance;
   a plurality of conductive second electrodes interleaved with the first electrodes;

a dielectric material disposed between the first electrodes and the second electrodes, the first and second electrodes and the dielectric material define a perimeter;

a conductive first surface disposed about at least a portion of the perimeter and electrically interconnected with the first electrodes; and at least one conductive second surface extending through the plurality of first and second electrodes, the second electrodes electrically interconnecting with the at least one conductive second surface, and the at least one conductive second surface being horizontally spaced equidistant from any point on the conductive first surface to reduce a loop inductance associated with the capacitor by an amount proportional to the distance between the conductive first surface and the at least one conductive second surface, and wherein the second conductive surface comprises a first terminal adapted to interface to a microelectronic device and wherein the first terminal includes a raised portion that overlaps at least a part of the dielectric material.

2. The capacitor of claim 1, wherein the first surface and the at least one second surface comprise a terminal end adapted to electrically interconnect with a conductive path.

3. The capacitor of claim 1, wherein the plurality of first electrodes are substantially perpendicular to the at least one second surface.

4. The capacitor of claim 1, wherein the plurality of second electrodes are substantially perpendicular to the at least one second surface.

5. The capacitor of claim 1, wherein the at least one second surface is cylindrical and substantially perpendicular to the layers of first and second electrodes.

6. The capacitor of claim 1, further comprising a dielectric material encapsulating the capacitor.

7. The capacitor of claim 1, wherein the at least one conductive second surface is substantially hollow to facilitate inter-cooling of the capacitor.

8. The capacitor of claim 1 wherein the first conductive surface comprises a second terminal adapted to interface to the microelectronic device.

9. An electronic device, comprising:

a power source;

a microelectronic device;

an electrically conductive path electrically interconnecting the microelectronic device to the power source;

a capacitor electrically interconnected with the electrically conductive path between the power source and the microelectronic device, the capacitor further comprising a plurality of conductive first electrodes layered and spaced apart by a predetermined distance;

a plurality of conductive second electrodes interleaved with the first electrodes;

a dielectric material disposed between the first electrodes and the second electrodes, the first and second electrodes and the dielectric material define a perimeter;

a conductive first surface disposed about at least a portion of the perimeter and electrically interconnect with the first electrodes; and at least one conductive second surface extending through the plurality of first and second electrodes, the second electrodes electrically interconnecting with the at least one conductive second surface, and the at least one conductive second surface being horizontally spaced equidistant from any point on the conductive first surface to reduce a loop inductance associated with the capacitor by an amount proportional to the distance between the conductive first surface and the at least one conductive second surface, and wherein the second conductive surface comprises a first terminal adapted to interface to a microelectronic device wherein the first terminal includes a raised portion that overlaps at least a part of the dielectric material.

10. The capacitor of claim 9, wherein the first surface and the at least one second surface comprise a terminal end adapted to electrically interconnect with a conductive path.

11. The capacitor of claim 9, wherein the plurality of first electrodes are and substantially perpendicular to the at least one second surface.

12. The capacitor of claim 9, wherein the plurality of second electrodes are substantially perpendicular to the at least one second surface.

13. The capacitor of claim 9, wherein the at least one second surface is cylindrical and substantially perpendicular to the layers of first and second electrodes.

14. The capacitor of claim 9, further comprising a dielectric material encapsulating the capacitor.

15. The capacitor of claim 9, wherein the at least one conductive second surface is substantially hollow to facilitate inter-cooling of the capacitor.

16. The electronic device of claim 9 wherein the first conductive surface comprises a second terminal adapted to interface to the microelectronic device.

17. A low loop inductance capacitor, comprising:

a plurality of interleaved first and second electrodes defining a generally rectangular body:

a dielectric material disposed between each first and second electrode;

a first terminal surrounding the plurality of first and second electrodes, the first surface being electrically interconnected with the first electrodes;

two second terminals extending through the plurality of first and second electrodes, the two second terminals being electrically interconnected with the second electrodes, and at least one of the two second terminals adapted to interface to a microelectronic device wherein the at least one terminal includes a raised portion that overlaps at least a portion of the dielectric material, the two second terminals being positioned within the body such that they are spaced an equal distance from a corresponding nearest point on the first terminal to reduce a loop inductance that is proportional to the distance between the first terminal and the two second terminals.

18. The capacitor of claim 17, wherein the loop inductance of the capacitor is substantially half of what it would be if only one second terminal was disposed in the body.

19. The capacitor of claim 17, wherein the two second terminals are substantially hollow to facilitate inter-cooling of the capacitor.

* * * * *

UNITED STATES PATENT AND TRADEMARK OFFICE
CERTIFICATE OF CORRECTION

PATENT NO. : 6,924,970 B2  Page 1 of 1
APPLICATION NO. : 10/335144
DATED : August 2, 2005
INVENTOR(S) : Mehr et al.

It is certified that error appears in the above-identified patent and that said Letters Patent is hereby corrected as shown below:

In the Claims:
Column 1, line 57, "...plates 10 and 14." should read --...plates 10 and 12.--;
Column 1, line 61, "...10 and 14,..." should read --...10 and 12,...--;
Column 5, line 38, "...of claim1 wherein..." should read --...of claim1, wherein..." --;
Column 6, line 13, "The capacitor of claim ..." should read --The electronic device of claim ...--;
Column 6, line 16, "The capacitor of claim ..." should read --The electronic device of claim ...--;
Column 6, line 19, "The capacitor of claim ..." should read --The electronic device of claim ...--;
Column 6, line 22, "The capacitor of claim ..." should read --The electronic device of claim ...--;
Column 6, line 25, "The capacitor of claim ..." should read --The electronic device of claim ...--;
Column 6, line 27, "The capacitor of claim ..." should read --The electronic device of claim ...--;
Column 6, line 30, "...claim 9 wherein ..." should read -- ... claim 9, wherein ...--.

Signed and Sealed this

Second Day of October, 2007

JON W. DUDAS
*Director of the United States Patent and Trademark Office*